United States Patent [19]

Damitz

[11] 3,963,045

[45] June 15, 1976

[54] CUSHION CONTROL ACCESSORY FOR PNEUMATIC OR HYDRAULIC CYLINDERS

[76] Inventor: Vernon Damitz, 347 N. Lincoln, Villa Park, Ill. 60181

[22] Filed: Oct. 24, 1974

[21] Appl. No.: 517,426

[52] U.S. Cl. .............................. 137/505.13; 91/447; 91/468; 91/DIG. 2

[51] Int. Cl.² .................. F15B 13/042; F16K 31/36; F16K 31/122

[58] Field of Search ........ 91/447, 452, 468, DIG. 2; 137/505.13, 498, 117

[56] References Cited

UNITED STATES PATENTS

| | | | |
|---|---|---|---|
| 2,051,732 | 8/1936 | McKee | 137/183 X |
| 2,541,464 | 2/1951 | Davies | 91/28 X |
| 2,823,648 | 2/1958 | Wood | 91/447 X |
| 3,016,046 | 1/1962 | Backofen | 91/447 |
| 3,072,107 | 1/1963 | Cassell | 91/447 X |
| 3,138,174 | 6/1964 | Gilpin | 137/498 |
| 3,227,179 | 1/1966 | Rosaen | 137/625.61 |
| 3,563,262 | 2/1971 | Wood | 137/117 |
| 3,575,204 | 4/1971 | McMurry | 137/498 |

*Primary Examiner*—Irwin C. Cohen
*Attorney, Agent, or Firm*—Gerald S. Geren

[57] ABSTRACT

A control apparatus for use with cylinder assemblies for cushioning the piston as it reaches the end of its stroke so as to control the speed at which the piston approaches the cylinder ends and to prevent damage to the cylinder assembly. The control apparatus includes a body which has an inlet port that is adapted for connection to the cylinder assembly and an outlet port that is aligned with the inlet port and is adapted to vent to atmosphere or for line connection. An expansion chamber is provided within the body and includes a valve for controllably venting the chamber. A first passageway connects the inlet port, outlet port and expansion chamber, and a second passageway connects the inlet port and the first passageway for controlling flow between the inlet port and expansion chamber. A spool-type valve element is provided which moves within the first passageway and controllably opens and closes the inlet port in response to the pressure in said expansion chamber so as to create the cushion in the cylinder. The air pressure in the chamber slowly vents through the valve means in the expansion chamber so as to permit controlled seating of the piston in the cylinder.

7 Claims, 6 Drawing Figures

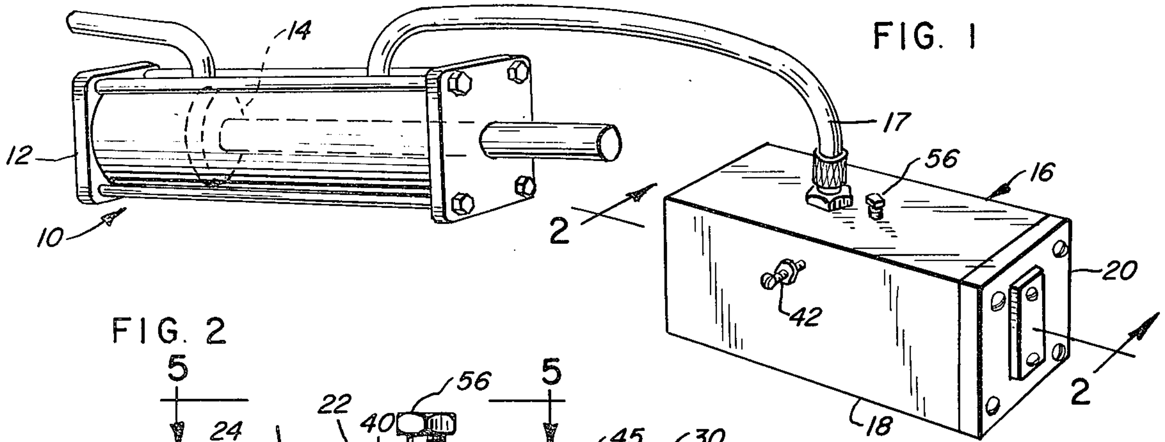
FIG. 1
FIG. 2
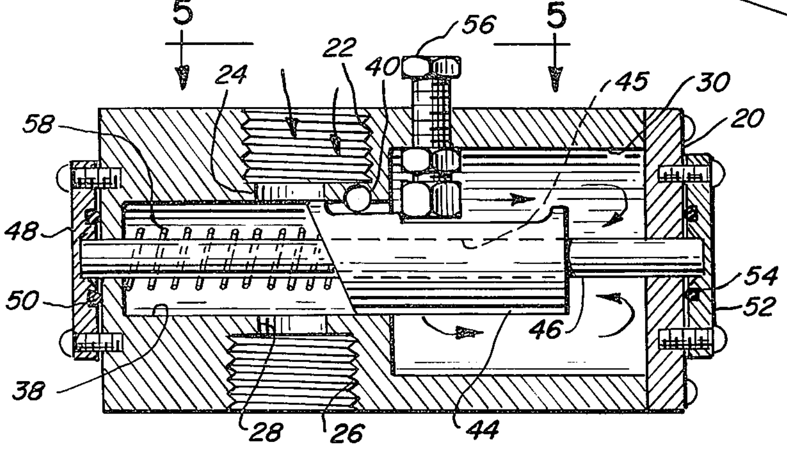
FIG. 6
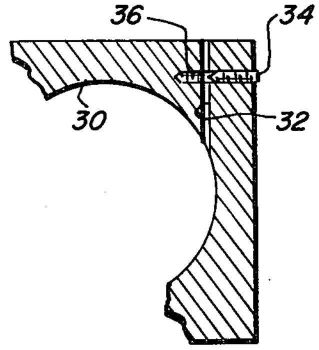
FIG. 3
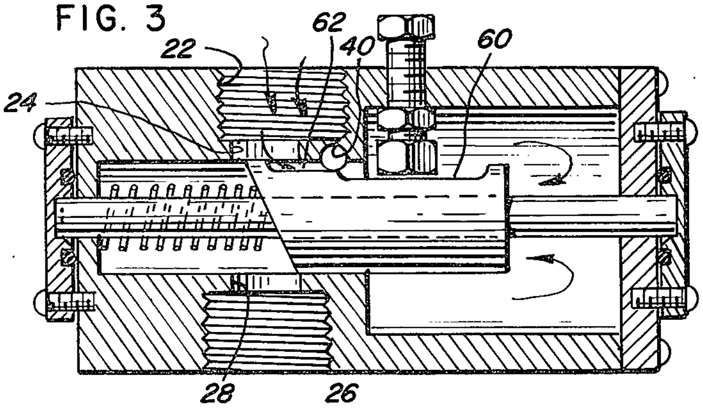
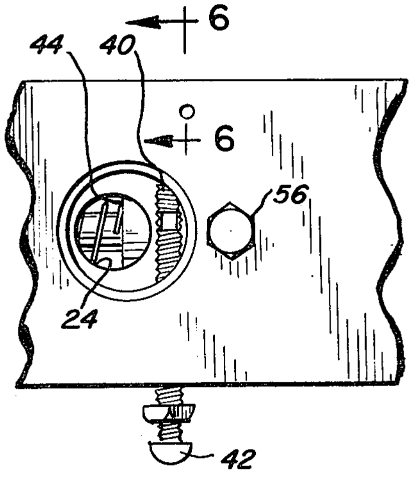
FIG. 5
FIG. 4
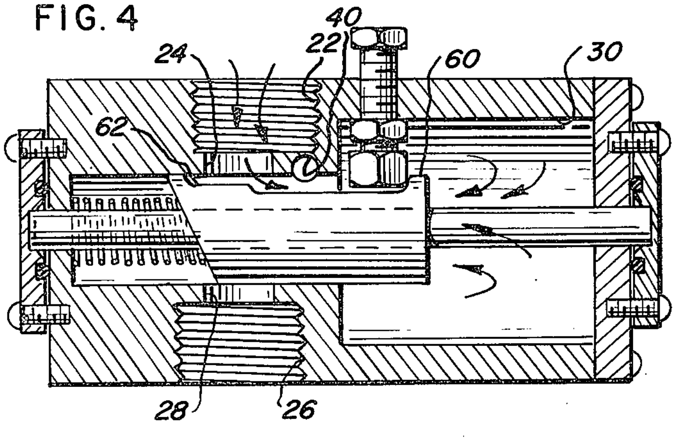

CUSHION CONTROL ACCESSORY FOR PNEUMATIC OR HYDRAULIC CYLINDERS

BACKGROUND OF THE INVENTION

This invention relates to piston and cylinder assemblies, and in particular, a control apparatus for use therewith.

Present commercial hydraulic or pneumatic piston and cylinder assemblies include a feature which permits the entrapment of a cushion of fluid at the end of the cylinder when the piston reaches the end of its stroke for reducing the speed at which the piston approaches the cylinder end and for preventing damage to the cylinder or piston by preventing the piston from striking or bottoming out against the cylinder end cap.

In commercial assemblies, this cushioning is obtained by providing the piston with a projection which extends from one end thereof and is adapted to fit into a bore in the cylinder end cap through which the fluid leaves the cylinder. In operation, near the end of the stroke the projection plugs the bore and traps a cushion of fluid between the cylinder cap and piston. This arrangement has the disadvantages that is requires expensive precision boring and formation of the two mating parts and is not readily adaptable for field installation to many types of cylinder assemblies.

Therefore, it is an object of this invention to provide a relatively inexpensive control apparatus for cushioning of pistons in cylinder assemblies and which can be adapted for field installation to many types of cylinder assemblies.

Another problem with existing cushioning arrangements is that the formation of the cushion or cushion size and the speed of the reduction or release of the cushion is not controllable.

It is, therefore, another object of this invention to provide a control apparatus which provides for controlling the cushion size and the speed of the cushion release.

These and other objects of this invention will become apparent from the following description and appended claims.

SUMMARY OF THE INVENTION

There is provided by this invention a control apparatus for use with cylinder assemblies for cushioning a piston at the end of its stroke, which is adapted for field installation to many types of cylinders. This apparatus provides a wide range of control over the cushion size and speed of cushion release.

This control apparatus includes a hollow body having: an inlet port for connection to the cylinder; and an outlet port that is aligned with the inlet port and is adapted to vent to atmosphere or for connection to an exhaust or return line. An expansion or accumulator chamber is provided within the body and includes valve means for controllably venting chamber to atmosphere or to the exhaust line. A first passageway interconnects the inlet port, outlet port and expansion chamber, and the second passageway connects the inlet port with the first passageway.

A valve element is positioned within the first passageway for providing communication between the inlet port and chamber and for controllably opening and closing the inlet port in response to increased pressure in the chamber resulting from increased fluid flow from said cylinder as said piston approaches the end of the cylinder. Closure of the inlet port by the valve element causes a pressure build up in the chamber which in turn causes a pressure build up in the cylinder which acts to cushion the piston. This cushion is slowly released through the vent means in the expansion chamber until the piston seats.

BRIEF DESCRIPTION OF THE DRAWINGS

FIG. 1 is a perspective view showing a cylinder and piston assembly with the control apparatus connected thereto;

FIG. 2 is a vertical sectional view taken substantially along line 2—2 of FIG. 1, with the inlet port in its fully opened position;

FIG. 3 is a view similar to FIG. 2 with the inlet port in a closed position;

FIG. 4 is a sectional view similar to FIG. 3 in which the inlet port is shown in its fully closed position;

FIG. 5 is a plan view of the controller as shown in FIG. 1 but with the connection to the cylinder being removed; and FIG. 6 is a fragmentary vertical sectional view taken substantially along line 6—6 of FIG. 5.

DESCRIPTION OF THE PREFERRED EMBODIMENT

Referring now to the drawings, there is shown a piston and cylinder assembly 10 generally, which includes a cylinder casing 12 and piston and piston rod assembly 14. The cylinder assembly 10 is connected to a cushion control apparatus 16 by means of the line 17, which is connected to the cylinder adjacent one end thereof.

It is to be understood that the control apparatus can be used with either hydraulic or pneumatic cylinder assemblies but that in order to facilitate the understanding of the invention the description herein is with reference to a pneumatic system. Furthermore, although only a single connection is shown to the cylinder assembly 10, other arrangements can be made for cushioning the piston at both ends of the stroke.

The control apparatus 16 includes a hollow body portion 18 and an end cap 20. The body is a metal member and has on one side thereof an internally threaded inlet port 22 which is adapted for connection to standard fittings. The port 22 terminates in a smaller diameter inlet aperture 24 at the internal end thereof. An exhaust or outlet port 26 is provided on the opposite side of the body and is generally aligned with the inlet port. The outlet port terminates in a smaller diameter outlet aperture 28. The apertures 24 and 28 are axially aligned with each other.

A relatively large expansion or accumulator chamber 30 is also provided in the body. The expansion chamber is provided with an arrangement for adjustably venting the chamber to atmosphere. The vent passageway 32 extends between the chamber 30 and the surface of the body. A control valve 34, in this case in the form of an Allen screw, can be axially moved inwardly and outwardly within a tapped hole 36 that intersects the passageway 32 for controlling flow between the expansion chamber 30 and atmosphere and thus the rate at which the cushion is reduced. In an alternative arrangement a vent passageway can be provided which connects the chamber 30 and outlet port 26 so that venting is to the outlet port rather than atmosphere.

A cylindrical, valve-element receiving and flow interconnecting passageway 38 is provided which extends axially from the expansion chamber toward the closed end of the body 18. This passageway interconnects the inlet and outlet ports as well as the expansion chamber.

A flow-sensing and flow-directing passageway 40 is drilled through the side of the body and connects the inlet port 22 with the flow passageway 38. A flow controller 42, which in the illustrative embodiment is a screw, is provided for axial movement within said flow passageway. Manipulation of this screw provides for controlling the air flow rate to the expansion chamber, and thus at what pressure level the cushioning is initiated and the size of the cushion. This passageway is intended to direct air directly into the expansion chamber as the piston nears the end of its stroke and to provide communication between the cushion and the expansion chamber.

A valve assembly is provided in the passageway 38 for assuring communication between the chamber and inlet port and for opening and closing of the inlet aperture 24 in response to increased pressure in the chamber 30. This assembly includes a slidable cylindrical or spool-type valve element 44, which fits within the passageway 38, and has a central bore 45 through which the support shaft 46 extends. The shaft 46 extends through a small diameter opening at the closed end of the body and held in place by a retaining cap 48, which is pneumatically sealed by virtue of the O-ring 50. A similar cap 52 and O-ring 54 are provided on the end cap 20. A valve element movement limiter or abutment member 56 is provided for limiting axial movement of the valve element and for preventing the valve element from rotating about the support shaft. However, it should be appreciated that other anti-rotating devices can be provided. In this embodiment the abutment member is in the form of a nut-and-bolt in which a nut is positioned within the expansion chamber. The valve element itself is spring biased by the coiled compression spring 58 toward the expansion chamber end of the body.

The valve element 44 includes two flat land portions 60 and 62 which cooperate with the second passageway 40 in directing flow between the inlet and the chamber and for assuring communication therebetween. As can be seen, the lands always connect at least the second passageway 40 with the chamber. The two extremities of the first land portion 60 act as limiters which abut the stop member 56 and prevent movement of the valve element beyond predetermined points.

In this embodiment both lands act as flow directors, and the element 44 is arranged such that when the inlet aperture 22 is open and the valve element is in its retracted position, the land 62 aligned with the flow control passageway 40. In this position, some flow is diverted to the expansion chamber while most of the flow is directed through the outlet port. Increases in the flow rate, such as when the piston nears the end of the stroke, will cause flow into the chamber 30 which, depending upon the rate of venting, cannot be vented quickly, resulting in a pressure build up in the expansion chamber that urges the element against the bias spring. When the pressure is sufficient to overcome the bias spring, the valve element almost instantaneously closes the inlet aperture and all flow is directed into the chamber 30.

The valve element has a tapered front face that engages the bias spring. This face is arranged with respect to the lands so that when the inlet is closed at least a small portion of the outlet aperture remains open. This prevents a cushion from building up in the passageway 38 in front of the valve element which would prevent proper closure of the inlet. This also provides a means for positively unseating the valve element in the event it becomes stuck in the passageway 38 by directing fluid flow in the reverse direction through the outlet to the inlet which would cause the valve element to move toward the chamber and thus open the inlet port.

In operation, as the piston 14 approaches the end of its stroke, the air pressure or fluid pressure within the cylinder begins to build up and some of the fluid passes through the inlet to the outlet while some of the fluid also passes via the control passageway 40 and valve element land 62 into the expansion chamber. If the fluid pressure build up is faster than the venting, the pressure will build up within the expansion chamber 30 and thereby urge the valve element against its spring bias toward a position where the inlet port 24 will be closed. The valve element moves against the biasing spring until the rear edge of the land 60 abuts the limiter 56 and the movement of the valve element is stopped. In the stopped position the inlet is closed, but the outlet is slightly open. Once the inlet port is completely closed, the air pressure in the expansion chamber continues to build up so as to balance the air pressure in the cylinder, thereby cushioning the movement of the piston. The air pressure in the expansion chamber is then vented through the vent 32 and thus in effect slowly venting the cylinder so as to permit the piston to softly bottom out in the cylinder. After the pressure in the expansion chamber has been vented and the piston seated, the bias spring returns the valve element to the open position.

The controller can be used in other arrangements, such as where the fluid circuit includes two lines, each connected at one end to an end of the cylinder and at the other end to a switch or valve that is in turn connected to the fluid inlet for directing flow to one line or the other. These switches or valves usually include an exhaust port to which the control inlet port can be connected for controlling the cushion at both ends of the stroke. If it is so desired, the controller outlet can be connected to a line leading to the fluid source, or in the case of a pneumatic cylinder, vented to atmosphere.

This controller can also be used in the line connecting one end of the cylinder with the switch or valve in which case the chamber is vented to the outlet port so as to provide a flow through the controller. In this case the inlet port is connected to the line coming from the cylinder and the outlet port to the line going to the control valve. When fluid flows to the cylinder, the controller acts as a conduit with flow passing directly from outlet to inlet, while when fluid flows from the cylinder, the controller provides the cushion.

Furthermore while the controller is shown in one attitude, it will be appreciated that it can operate in any number of positions.

It will be appreciated that numerous changes and modifications can be made to the embodiment shown herein without departing from the spirit and scope of this invention.

What is claimed and desired to be secured by the Letters Patent of the United States is:

1. A cushion control apparatus, for use with a pneumatic cylinder assembly which has a cylinder and a piston, for cushioning the piston as said piston reaches the end of its stroke and for preventing damage to the cylinder assembly, which comprises:

a. a body having: an inlet port on one side of the body which is adapted to receive air flow from a cylinder; an outlet port; expansion chamber means within said body; first branched passageway means within said body interconnecting said inlet port, outlet port and said expansion chamber means; and second passageway means connecting said inlet port and a branch of said first passageway means for cooperating in directing air flow from said inlet port to said chamber means;

b. pressure responsive valve element means for cooperation in directing air flow from said inlet port through said second passageway to said chamber means and for controllably opening said inlet port and closing said inlet port in response to increased pressure in said chamber means so as to cushion said piston, said valve element means being mounted in said first passageway for reciprocal movement therein and said valve element means being generally cylindrical in shape and including land portion means cooperating with said body which means are arranged for providing communication between said second passageway and said expansion chamber means;

c. valve means associated with said chamber means for venting said chamber means to atmosphere so as to controllably release said cushion; and d. control valve means are provided in association with said second passageway for cooperating in controlling the flow of air from said inlet port to said expansion chamber means.

2. A cushion control apparatus as in claim 1 wherein means are provided for assuring alignment of said land portion means with respect to said second passageway.

3. A cushion control apparatus as in claim 1 wherein said valve element means is provided with a tapered surface so that when said valve element means is in the inlet closed position, said outlet port side of said primary passageway is slightly open.

4. A cushion control apparatus as in claim 1 wherein there is further provided means for urging the valve element to the inlet open position and there is also provided stop means for limiting the movement of said element in one direction past a first position where the inlet is open and for preventing movement of the valve element in the other direction past a second position where said outlet port is slightly open.

5. A control apparatus, for use with a pneumatic cylinder assembly having cylinder means and reciprocable piston means, to controllably cushion the piston means at the end of the stroke so as to minimize damage to the cylinder assembly, said control apparatus comprising:

chamber means;

primary air flow passageway means having: an inlet port at one end for connection to a cylinder assembly and an outlet port at the other end;

means associated with said chamber means and said primary passageway means at a position upstream of said inlet port for establishing and controlling air flow to said chamber means from said inlet port;

pressure responsive valve means associated with said chamber means and said primary passageway means for controlling air flow through said passageway means in relation to pressure differential between said chamber means and said passageway means; secondary passageway means associated with said valve means and opening in response to movement thereof for connecting said primary passageway means with said chamber means; and vent means associated with said chamber means for controllably venting said chamber to atmosphere.

6. A control apparatus for use with a pneumatic cylinder assembly having a cylinder and a piston to cushion the piston at the end of the stroke and minimize damage to the cylinder assembly, said control apparatus comprising:

a. a body having:

i. means defining an accumulator chamber therein, ii. means defining a primary air flow passageway having: an inlet port at one end for connection to a cylinder assembly and an outlet port opening to atmosphere, iii. means defining a valve element receiving passageway for interconnecting said chamber and said primary air flow passageway, iv. means defining a chamber inlet passageway for directing flow from said primary passageway, at a position upstream of said inlet port and downstream of said valve element receiving passageway, to said chamber, v. means defining a vent passageway for venting said chamber to atmosphere.

b. chamber inlet valve means operatively associated with said inlet passageway for controlling flow through said inlet passageway means, c. vent valve means operatively associated with said vent passageway for controlling flow from said chamber through said vent passageway, and d. pressure responsive valve element means operatively associated with said valve element receiving passageway means for controlling flow through said primary passageway means in relation to the difference in pressure between said chamber and said primary passageway means, said valve element means being mounted for reciprocal movement between an open position and a closed position, and a secondary passageway associated with said valve element means and opening in response to movement thereof for communicating the primary passageway with said chamber.

7. A control apparatus as in claim 6, wherein said body includes an alignment element, said valve element passageway is generally cylindrically shaped and said valve element is generally cylindrically shaped and includes:

means defining a land portion for permitting flow from said inlet port through said valve element receiving passageway means to said chamber defining said secondary passageway; and means cooperating with said alignment element for assuring alignment of said land portion with said inlet side of said primary passageway.

* * * * *